(12) United States Patent
Ehrhardt et al.

(10) Patent No.: US 12,388,261 B2
(45) Date of Patent: Aug. 12, 2025

(54) GENERATOR UNIT AND METHOD FOR OPERATING A GENERATOR UNIT IN A POWER PLANT

(71) Applicant: Siemens Energy Global GmbH & Co. KG, Bayern (DE)

(72) Inventors: Klaus Ehrhardt, Schwaig (DE); Lothar Pistor, Wendelstein (DE); Wieland Uecker, Spardorf (DE); Ronald Völzke, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/769,448

(22) PCT Filed: Oct. 9, 2020

(86) PCT No.: PCT/EP2020/078422
§ 371 (c)(1),
(2) Date: Apr. 15, 2022

(87) PCT Pub. No.: WO2021/078537
PCT Pub. Date: Apr. 29, 2021

(65) Prior Publication Data
US 2024/0128753 A1    Apr. 18, 2024

(30) Foreign Application Priority Data
Oct. 22, 2019  (DE) ............... 10 2019 216 236.3

(51) Int. Cl.
*H02J 3/18* (2006.01)
*H02J 3/38* (2006.01)
(Continued)

(52) U.S. Cl.
CPC ............ *H02J 3/1885* (2013.01); *H02J 3/388* (2020.01); *H02J 3/48* (2013.01); *H02J 3/50* (2013.01)

(58) Field of Classification Search
CPC .... H02J 3/1885; H02J 3/38; H02J 3/48; H02J 3/50
(Continued)

(56) References Cited

U.S. PATENT DOCUMENTS

| 1,752,666 A | 4/1930 | Gay |
| 2005/0073284 A1 | 4/2005 | Sivasubramaniam |

(Continued)

FOREIGN PATENT DOCUMENTS

| AU | 3458868 B1 | 9/1969 |
| DE | 102006042754 A1 | 4/2007 |

(Continued)

OTHER PUBLICATIONS

International search report and written opinion dated Feb. 3, 2021 for corresponding PCT/EP2020/078422.
(Continued)

*Primary Examiner* — Daniel Kessie
*Assistant Examiner* — Dru M Parries
(74) *Attorney, Agent, or Firm* — Wolter Van Dyke Davis, PLLC

(57) ABSTRACT

A generator unit as a component of a power plant connected to the electrical grid, includes a first generator with a rotor connected to a drive turbine via a shaft, a second generator and a three-winding high-voltage transformer. The first generator is an active power generator and the second generator is a purely reactive power generator, and the first and the second generators are connected to the electrical grid via a separate generator output line and via the three-winding high-voltage transformer.

13 Claims, 2 Drawing Sheets

(51) Int. Cl.
*H02J 3/48* (2006.01)
*H02J 3/50* (2006.01)

(58) Field of Classification Search
USPC .......................................................... 307/47
See application file for complete search history.

(56) References Cited

U.S. PATENT DOCUMENTS

| | | |
|---|---|---|
| 2015/0168981 A1 | 6/2015 | Skliutas et al. |
| 2015/0364920 A1 | 12/2015 | Konopinski et al. |
| 2018/0212492 A1 | 7/2018 | Sethi et al. |

FOREIGN PATENT DOCUMENTS

| | | | |
|---|---|---|---|
| DE | 102006020144 A1 | 11/2007 | |
| EP | 1548278 A2 | 6/2005 | |
| JP | S57151239 A | 9/1982 | |
| JP | S58133129 A | 8/1983 | |
| JP | H07332012 A | 12/1995 | |
| JP | H10191699 A | 7/1998 | |
| JP | 2005117893 A | 4/2005 | |
| JP | 2016036238 A | 3/2016 | |
| JP | 2016208586 A | 12/2016 | |
| JP | 2019022358 A | 2/2019 | |
| KR | 20090111968 A | 10/2009 | |
| WO | WO-2010018194 A2 * | 2/2010 | ............... H02J 3/02 |
| WO | 2013143715 A2 | 10/2013 | |
| WO | 2014125592 A1 | 8/2014 | |

OTHER PUBLICATIONS

PCT International Search Report and Written Opinion of International Searching Authority mailed Feb. 3, 2021 corresponding to PCT International Application No. PCT/EP2020/078422 filed Oct. 9, 2020 (previously submitted).

* cited by examiner

GENERATOR UNIT AND METHOD FOR OPERATING A GENERATOR UNIT IN A POWER PLANT

CROSS REFERENCE TO RELATED APPLICATIONS

This application is the US National Stage of International Application No. PCT/EP2020/078422 filed 9 Oct. 2020, and claims the benefit thereof. The International Application claims the benefit of German Application No. DE 10 2019 216 236.3 filed 22 Oct. 2019. All of the applications are incorporated by reference herein in their entirety.

FIELD OF INVENTION

The invention relates to a generator unit (exciter unit) and to a method for operating a generator unit in a power plant with a nominal active power of 500 MW and higher.

BACKGROUND OF INVENTION

Electrical consumers draw electrical power (the product of current and voltage) from the power grid, the power largely being converted into usable power, so-called active power P. Inductively operating consumers that are connected to an alternating or three-phase circuit draw a reactive power Q from the power grid in addition to the build-up of magnetic fields, the consumers returning the reactive power to the power grid when the magnetic fields are reduced. This unusable reactive power oscillates back and forth between the generator and the consumer and puts a strain on the entire power grid. The vector sum of active and reactive power is referred to as apparent power S. Due to the phase shift, the power factor $\cos(\varphi)$ exists between the active and reactive power.

In addition to the provision of active power, power plants provide so-called grid services, which are defined in the individual grids by grid codes or grid connection conditions or, as in Germany, by VDE regulations. Grid services include the provision of short-circuit power, inertia and voltage stabilization. Power plants provide reactive power to stabilize the voltage in the grid. The short-circuit power is crucially determined by the sub-transient reactance ($X_d$) of the generator and the impedances of the generator transformers. Inertia is determined by the rotating masses of generators and turbines. With low reactance values, the demands on the generator circuit breaker become very high.

In generator units, the generator is located on a common shaft with a drive turbine. Together they form a rotating mass. In power plants, the use of large generator units places high demands on the generator itself as well as on the generator output line (phase bus) and the generator circuit breaker. Generators that are used in power plants are high-speed synchronous generators (turbo generators). Synchronous generators have the advantage that, depending on the control, they can deliver active power as well as inductive or capacitive reactive power to the supply grid or take up same from it. Depending on the level of their magnetic excitation, synchronous generators deliver pure active power or additionally deliver reactive power to the supply grid, which is required to compensate for inductive and capacitive consumers. The reactive power capability of the generator unit is defined by the power factor at the generator connections or by the power factor at the high-voltage interface to the power grid.

Due to the increased proportion of regenerative generators in the grid, the demands on grid services have also increased. In order to stabilize the power contribution of the regenerative generators in the grid, additional special phase shift generators are installed and operated as a separate unit, usually at a separate location from the power plant. These separate, additional phase shift generators provide reactive power and contribute to voltage stabilization. These units provide grid short-circuit power like power plants. The inertia provided is essentially limited to the inertia of the generator rotor.

SUMMARY OF INVENTION

The object of the invention is to specify a generator unit and a method for operating a generator unit for a power plant, through which the efficiency of active power generation is improved and the grid services are made more flexible with regard to reactive power generation, provision of short-circuit power and inertia. At the same time, the costs of the generator unit can be reduced.

The object of the invention directed to a generator unit is achieved by the features of the claims. The generator unit according to the invention is a component of a power plant connected to the power grid and comprises a first generator whose rotor is connected to a drive turbine via a shaft, a second generator, and a three-winding high-voltage transformer. According to the invention, the first generator is an active power generator and the second generator is a purely reactive power generator, and the first and second generators are connected to the power grid via a separate generator output line via the three-winding high-voltage transformer.

The invention is based on the consideration that the generator unit does not consist of a single generator but of two generators. In this case, the first generator is an active power generator which essentially provides active power and whose rotor is connected to a drive turbine via a shaft. The second generator is a purely reactive power generator which is not connected to a drive turbine and provides exclusively reactive power. Both generators are each connected to the three-winding high-voltage transformer via a separate generator output line.

The invention recognizes in this case that the generator unit with separate generators can be significantly increased on the one hand in terms of the efficiency of the active power and the flexibility of the provision of reactive power. The efficiency is increased by the fact that the first generator, which essentially provides active power, can be operated at largely nominal power and does not have to provide reactive power. The flexibility is increased because the power plant operator can ensure the provision of reactive power independently of the provision of active power. Consequently, the second reactive power generator can provide grid services even when the first active power generator and thus the entire process for generating active power is at a standstill. Both generators can be operated independently of one another.

What is surprising here is that, despite the increase in the number of components, the investment costs for the generator unit with two generators are lower than for generator units with one generator. The cost saving is achieved because the investment costs for two smaller generators are lower than for a large generator of comparable performance. Circuit breakers with lower short-circuit and operating current requirements can also be used, as a result of which the investment costs for two smaller generator circuit breakers can be significantly reduced in comparison with one large generator circuit breaker. Since it is irrelevant from the point of view of the power grid whether active and reactive power is provided by one or separately by two generators, this change in the generator unit does not require approval for operation.

The operation of the generator system requires a particular design of the three-winding high-voltage transformer wound in such a way that the different impedances, load flows and voltage differences of the first generator and the second generator can be transformed into the power grid. The three-winding high-voltage transformer is to be considered as one unit on the power grid with regard to different impedances, transformation ratios of the voltages, etc. to the generator unit with two generators.

The first generator is advantageously connected to the three-winding high-voltage transformer via a first generator output line and the second generator is advantageously connected to the three-winding high-voltage transformer via a second generator output line. The first generator, a first start-up converter and a first generator machine are connected in the first generator output line. The second generator, a second start-up converter and a second generator machine are connected in the second generator output line.

Start-up converters and generator machines form the essential auxiliary systems of the generators. Because the auxiliary systems, like the generators, are separate, the first generator and the second generator can be operated independently of one another. In large power plants (>500 MW), two separate generator output lines are also more economical overall in terms of their investment costs than a single generator output line, since these are easier to dimension and manufacture and they do not have to be forced-cooled.

The output of the second generator is advantageously lower than the output of the first generator. This is possible because more active power than reactive power has to be provided in the power grid. The output of the second generator results from the reactive power requirements of the grid code or similar, which are determined by load flow calculations.

In a particular configuration of the invention, a respective generator circuit breaker is integrated in the first generator output line of the first generator and in the second generator output line of the second generator, through which generator circuit breaker the generators can be disconnected from the grid independently of one another. Because the generator output line experiences a lower current load when the generators are separated for active and reactive power operation, the costs of two generator output lines are less than the cost of one generator output line when used with one generator. The same applies to the generator circuit breakers, whose requirements in terms of short-circuit breaking capacity and nominal operational currents are considerably lower.

The object of the invention, directed to a method for operating a generator unit, is achieved by a generator unit, which is a component of a power plant connected to the power grid, comprising a first generator, which is connected to a drive turbine via a shaft, a second generator, and a high-voltage transformer. According to the invention, the first generator is operated at a power with maximum efficiency, and essentially provides the power grid with active power, short-circuit power and inertia, and the second generator is operated as a purely reactive power generator, and provides voltage stabilization exclusively to the power grid.

The advantages of the invention directed to the generator unit apply equally to the method for operating a generator unit.

In an advantageous configuration of the method, the first generator is connected to the three-winding high-voltage transformer via a first generator output line and the second generator is connected to the three-winding high-voltage transformer via a second generator output line. Auxiliary systems are still connected in the first and second generator output lines. To this end, a first start-up converter and a first generator machine are connected in the first generator output line, and a second start-up converter and a second generator machine are connected in the second generator output line. Because the auxiliary systems, like the generators, are separate, the first generator and the second generator can be operated independently of one another.

In a further advantageous configuration of the method for operating the generator unit, a respective generator switch is integrated in the generator output line of the first generator and in the generator output line of the second generator. This allows the generators to be disconnected from the grid independently of one another.

The second generator is advantageously only operated when the first generator is not able to provide the reactive power generation for voltage stabilization alone. Only in this case is the second generator operated. The first generator provides active and apparent power. This can be advantageous when the requirements for active and apparent power from the power grid are low and can be provided solely by the first generator.

The second generator is advantageously operated for grid voltage stability, inertia and grid short-circuit power. The second generator is operated when the grid operator does not request active power, as this is guaranteed by regenerative generation. The generator provides the network operator with reactive power for grid voltage stability, inertia and grid short-circuit power. These grid services cannot be provided by regenerative generators.

The invention is advantageously used in large power plants, for example gas power plants or combined gas and steam power plants, in which the turbines and the active power generator are arranged on a common shaft.

BRIEF DESCRIPTION OF THE DRAWINGS

The invention is described in more detail in the text which follows with reference to figures. In the figures.

DETAILED DESCRIPTION OF INVENTION

Figure 1:
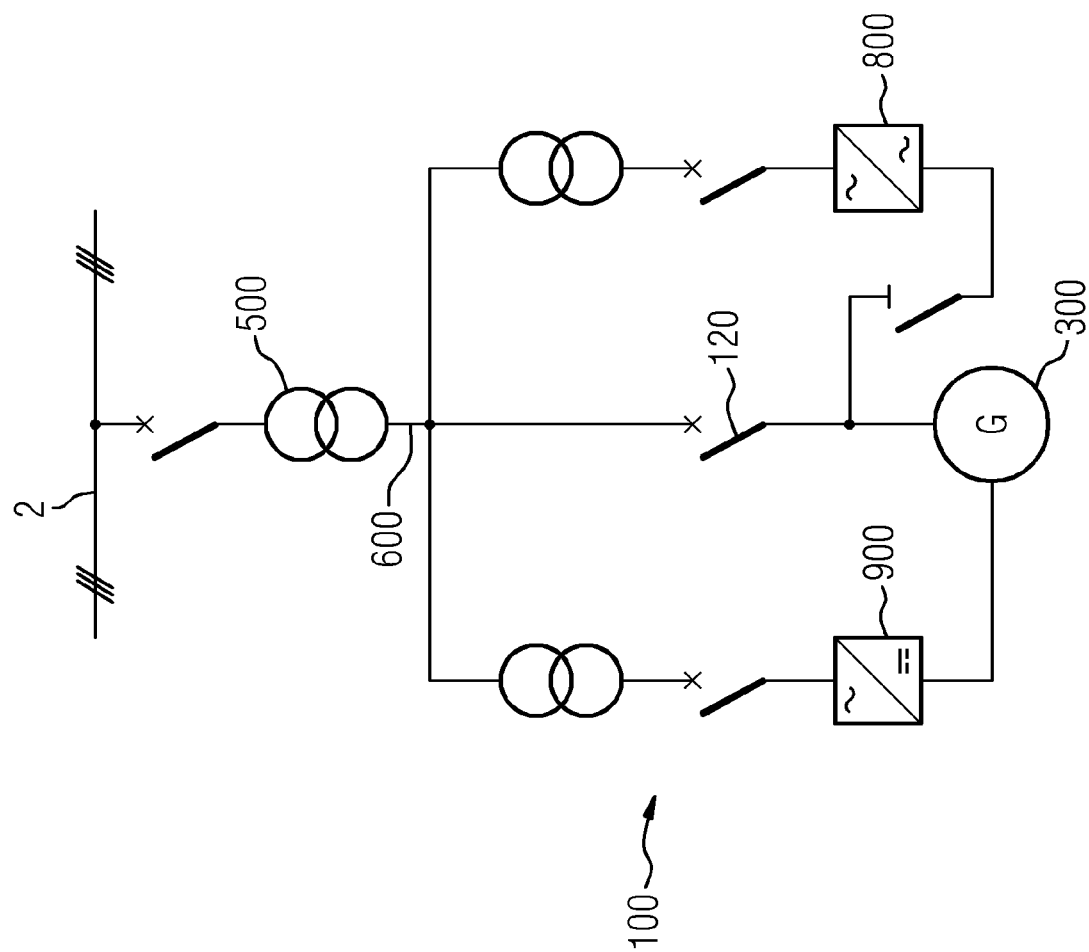
FIG. 1 shows a circuit diagram of a generator unit with a generator according to the prior art.

FIG. 1 shows a circuit diagram of a generator unit 100 with a generator 300 according to the prior art. In addition to the generator 300, the generator unit 100 comprises a generator output line 600, a start-up converter 800, a generator circuit breaker 120, a generator machine 900 and a two-winding high-voltage transformer 500.

It is not shown separately how the rotor of the generator 300 is arranged on a common shaft with a drive turbine. The generator 300 provides the power grid 2 with active and reactive power.

Figure 2:
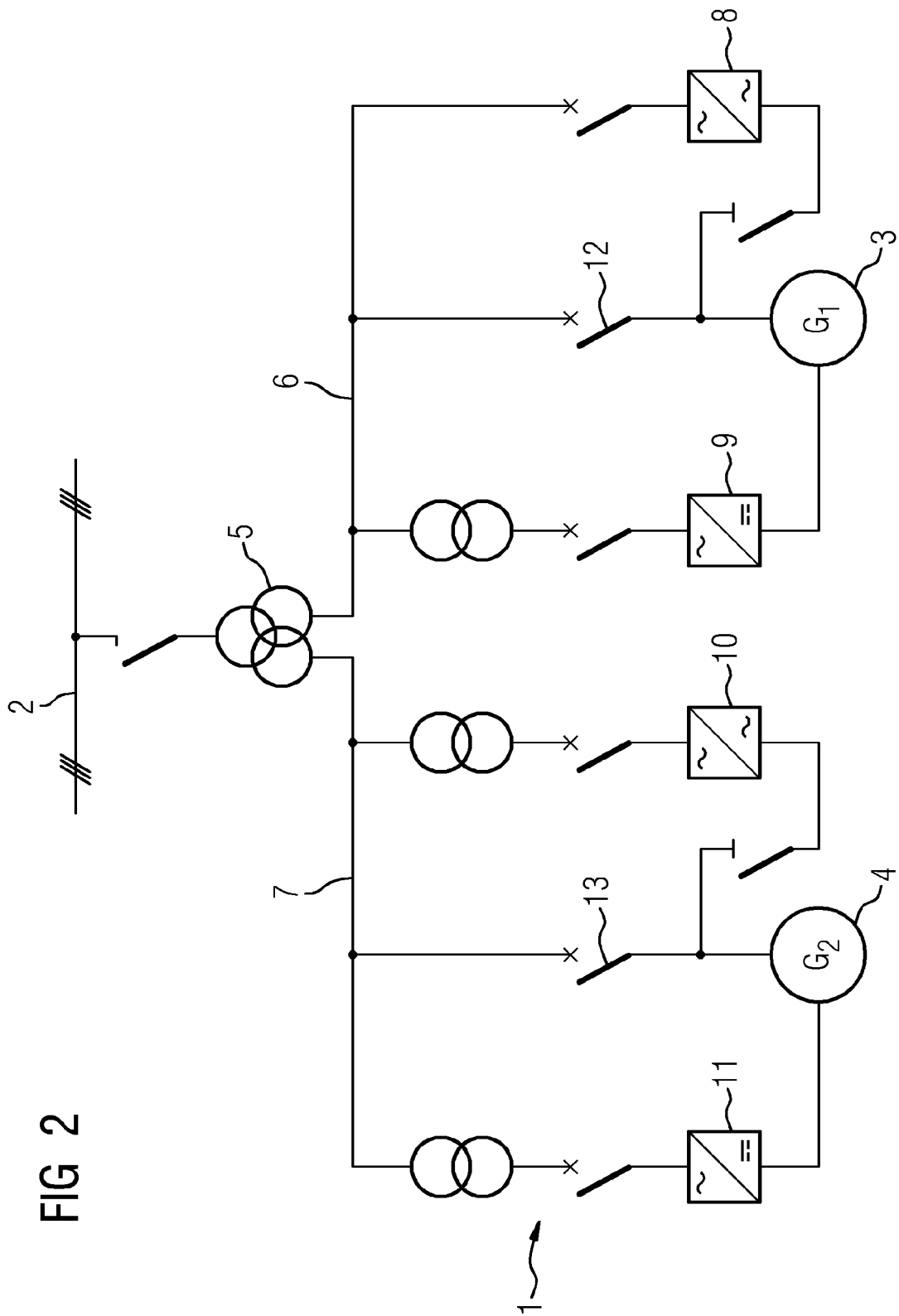
FIG. 2 shows a circuit diagram of the generator unit according to the invention with two generators.

FIG. 2 shows a circuit diagram of the generator unit 1 according to the invention with two separate generators 3 and 4. The generator unit 1 comprises a first generator 3 and a second generator 4. The first generator 3 is essentially operated as an active power generator. The power factor cos(φ) is between 0.95 and 1 in this case. The second generator 4 is operated as a reactive power generator, operates at a power factor cos(φ)=0, and supplies reactive power according to the grid requirement.

The first generator 3 is connected to a first generator output line 6, which connects the first generator 3 to the three-winding high-voltage transformer 5. A first start-up converter 8, a first static excitation system 9 and a first generator circuit breaker 12 are each connected in parallel in the first generator output line 6.

The second generator 4 is connected to a second generator output line 7, which connects the second generator 4 to the three-winding high-voltage transformer 5. A second start-up converter 10, a second static excitation system 11 and a second generator circuit breaker 13 are each connected in parallel in the second generator output line 7.

The three-winding high-voltage transformer 5 connects the generator unit 1 to the power grid 2.

The generator switches 12, 13 are used to be able to disconnect the generators from the power grid 2. To start up and then synchronize the generators 3, 4 with the power grid, both generators 3, 4 have a static frequency converter 8, 10 for accelerating the generators to the required rotational speed. The frequency converter also allows the generators to be started simultaneously.

The static excitation system 9, 11 for each generator 3, 4 serves to regulate the voltage of the generators and also to support grid voltage stability.

By separating active and reactive power operation, the first generator 3 can be operated with active power with the highest degree of efficiency. The second generator 4 can also be used for reactive power operation if this is required by the grid services. If, for example, the active power of the first generator 3 is between 80 and 90%, it is not necessary to operate the second generator 4 since the first generator 3 alone meets the grid requirements.

The second generator 4 can be operated independently of the first generator 3 as a phase shift generator in order to support the stability of the grid voltage and to ensure the short-circuit power and inertia to the grid.

There are a number of advantages, especially for large generator arrangements with very high active power (P>500 MW). Two generators, divided into active and reactive power, are cheaper than the acquisition costs of a large generator and can also be used more flexibly. The flexibility is increased because pure power plant operation can be separated from the grid services.

The invention claimed is:

1. A generator unit as a component of a power plant connected to a power grid, comprising:
    a first generator whose rotor is connected to a drive turbine via a shaft,
    a second generator,
    a three-winding voltage transformer,
    a first generator output line connecting the first generator to the three-winding voltage transformer,
    a first start-up converter and a first static excitation system are connected to the first generator output line, with the first generator and the first start-up converter and the first static excitation system being connected in parallel,
    a second generator output line connecting the second generator to the three-winding voltage transformer, and
    a second start-up converter and a second static excitation system for the second generator are connected in parallel to the second generator output line, with the second generator and the second start-up converter and the second static excitation system being connected in parallel,
    wherein the first generator generates active and apparent power, with the apparent power including reactive power generation for voltage stabilization, and the second generator is operated to generate reactive power when the first generator is not able to provide the reactive power generation for voltage stabilization in the power grid alone, and
    wherein the first generator, the first start-up converter and the first static excitation system are connected in parallel to the second generator, the second start-up converter and the second static excitation system, with the first and second static excitation systems being configured to simultaneously start the first and second generators to a desired rotational speed.

2. The generator unit as claimed in claim 1,
    wherein the three-winding voltage transformer is configured so that different impedances, load flows and voltage differences of the first generator and the second generator are transformed into the power grid, with the three-winding voltage transformer appearing as one unit on the power grid with regard to different impedances and transformation ratios of voltages to the first and second generators.

3. The generator unit as claimed in claim 1,
    wherein the output of the second generator is lower than the output of the first generator.

4. The generator unit as claimed in claim 1,
    wherein a respective generator circuit breaker is integrated in the first generator output line of the first generator and in the second generator output line of the second generator, through which generator circuit breaker, the first and second generators can be disconnected from the power grid independently of one another.

5. The generator unit as claimed in claim 1, wherein the second generator is operated as a phase shift generator to support grid voltage stability, inertia and grid short-circuit power.

6. The generator unit as claimed in claim 1,
    wherein the second generator further generates reactive power when the first generator is at a standstill and is not able to generate active power in the power grid.

7. The generator unit as claimed in claim 1,
    wherein the first generator and the second generator operate independently of one another while each generator is connected to the three-winding voltage transformer.

8. A method for operating a generator unit, which is a component of a power plant connected to a power grid, comprising a first generator, which is connected to a drive turbine via a shaft, a second generator, and a three-winding voltage transformer, the method comprising:
    operating the first generator to generate active and apparent power, with the apparent power including reactive power generation for voltage stabilization, and
    operating the second generator as a purely reactive power generator, with the second generator being operated when the first generator is not able to provide the reactive power generation for voltage stabilization alone,
    wherein the first generator is connected to the three-winding voltage transformer via a first generator output line, and the second generator is connected to the three-winding voltage transformer via a second generator output line, wherein a first start-up converter and a first static excitation system are connected in parallel to the first generator output line, and a second start-up converter and a second static excitation system are connected in parallel to the second generator output, and wherein the first generator, the first start-up converter, the first static excitation system and the first generator are connected in parallel to the second generator, the second start-up converter and the second static excitation system, with the first and second static excitation systems being configured to simultaneously start the first and second generators to a desired rotational speed.

9. The method for operating a generator unit as claimed in claim 8, wherein a respective generator circuit breaker is integrated in the first generator output line of the first generator and in the second generator output line of the second generator, through which generator circuit breaker, the first and second generators can be disconnected from the power grid independently of one another.

10. The method for operating a generator unit as claimed in claim 8, wherein the second generator is operated as a phase shift generator to support grid voltage stability, inertia and grid short-circuit power.

11. The method for operating a generator unit as claimed in claim 8, wherein the three-winding voltage transformer is configured so that different impedances, load flows and voltage differences of the first generator and the second generator are transformed into the power grid, with the three-winding voltage transformer appearing as one unit on the power grid with regard to different impedances and transformation ratios of voltages to the first and second generators.

12. The method for operating a generator unit as claimed in claim 8, wherein the second generator further generates reactive power when the first generator is at a standstill and is not able to generate active power in the power grid.

13. The method for operating a generator unit as claimed in claim 8, wherein the first generator and the second generator operate independently of one another while each generator is connected to the three-winding voltage transformer.

* * * * *